United States Patent
MacLeod et al.

(10) Patent No.: US 6,952,704 B2
(45) Date of Patent: Oct. 4, 2005

(54) EXTENDING A DIRECTORY SCHEMA INDEPENDENT OF SCHEMA MODIFICATION

(75) Inventors: Stewart P. MacLeod, Woodinville, WA (US); James H. Booth, Issaquah, WA (US); Kim Cameron, Bellevue, WA (US); Jonathan A. Fischer, Carnation, WA (US); Max L. Benson, Redmond, WA (US); Felix Wong, Bellevue, WA (US); Robert Dan Thompson IV, Fort Worth, TX (US); Hilal Al-Hilali, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 09/995,001

(22) Filed: Nov. 26, 2001

(65) Prior Publication Data

US 2003/0105770 A1 Jun. 5, 2003

(51) Int. Cl.$^7$ .............................................. G06F 17/30
(52) U.S. Cl. ............................ 707/103 R; 707/103 Y; 707/103; 707/103 Z; 707/104.1
(58) Field of Search ........................ 707/103 R, 103 Y, 707/103 Z, 104.1, 10, 100, 103

(56) References Cited

U.S. PATENT DOCUMENTS

| | | | |
|---|---|---|---|
| 5,802,511 A | | 9/1998 | Kouchi et al. |
| 5,859,978 A | * | 1/1999 | Sonderegger et al. ....... 709/226 |
| 6,223,145 B1 | | 4/2001 | Hearst |
| 6,285,366 B1 | | 9/2001 | Ng et al. |
| 6,434,564 B2 | | 8/2002 | Ebert |
| 6,442,557 B1 | | 8/2002 | Buteau et al. |
| 6,463,420 B1 | * | 10/2002 | Guidice et al. ............... 705/28 |
| 6,564,263 B1 | | 5/2003 | Bergman et al. |
| 6,643,652 B2 | * | 11/2003 | Helgeson et al. ............. 707/10 |
| 6,708,161 B2 | * | 3/2004 | Tenorio et al. ................ 707/2 |
| 2001/0047385 A1 | * | 11/2001 | Tuatini ....................... 709/203 |
| 2002/0169744 A1 | | 11/2002 | Cooke et al. |
| 2004/0002982 A1 | * | 1/2004 | Ersek et al. ................ 707/100 |

OTHER PUBLICATIONS

Biron et al. (www.w3.org) discloses a XML Schema Part 2: Dataypes W3C Recommendation, May 2, 2001, pp. 1–21.*
Chita, C.; "Hierarchy Visualization" Publication found on the Internet in May 2004 http://www.cs.ubc.ca/~tmm/courses/cpsc533c-04-spr/slides/0331.cchita2.6up.pdf.
T. Howes, et al., "The LDAP URL Format", The Internet Society, Dec. 1997, 8 pages.
M. Wahl, "A Summary of the X.500(96) User Schema for use with LDAPv3", The internet Society, Dec. 1997, 20 pages.
M. Wahl, et al., "Lightweight Directory Access Protocol (v3)", Internet Society, Dec. 1997, 50 pages.

(Continued)

*Primary Examiner*—Safet Metjahic
*Assistant Examiner*—Haythim Alaubaidi
(74) *Attorney, Agent, or Firm*—Lee & Hayes, PLLC

(57) ABSTRACT

The described arrangements and procedures provide a directory schema with object classes that have flexible attributes. This means that attributes can be extended independent of modifications to the directory schema. Specifically, an object instance of a content class described in the directory schema is instantiated. The content class includes a flexible attribute having a data type. A property is assigned to the attribute. The property is any combination of an operational and data providing property. The property is independent of the attribute's data type. Thus, without modifying the directory schema, multiple instances of the same object class can have attributes that provide completely different data types and completely different data operations.

21 Claims, 5 Drawing Sheets

OTHER PUBLICATIONS

M. Wahl, et al, "Lightweight Directory Access Protocol (v3): UTF–8 String Representation of Distinguished Names", The Internet Society, 10 pages.

T. Howes, "The String Representation of LDAP Search Filters", The Internet Society, 8 pages.

M. Wahl et al, "Lightweight Directory Access Protocol (v3): Attribute Syntax Definitions", The Internet Society, Dec. 1997, 32 pages.

Melbourne, "The Directory—Overview of Concepts, Models and Services", 1988, 47 pages.

"Information Technology—Open Systems Interconnection—The Directory: The Models", Recommendation X.501, ISO/IEC 9594–2, Feb. 14, 1993, 164 pages.

* cited by examiner

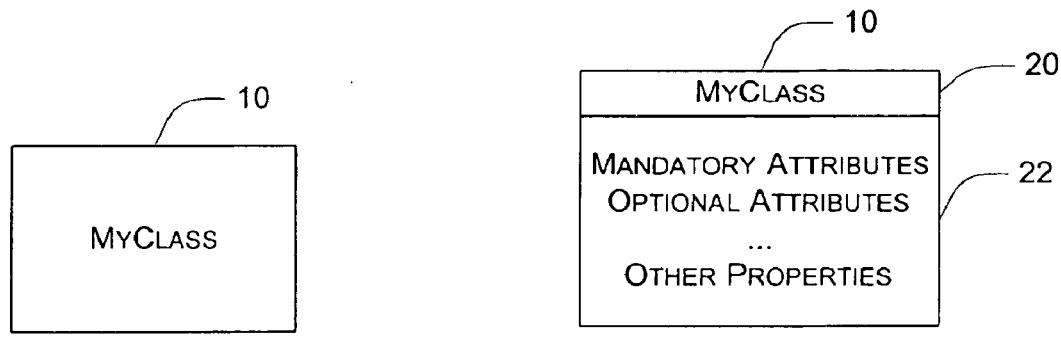
*Fig. 1*   *Fig. 2*
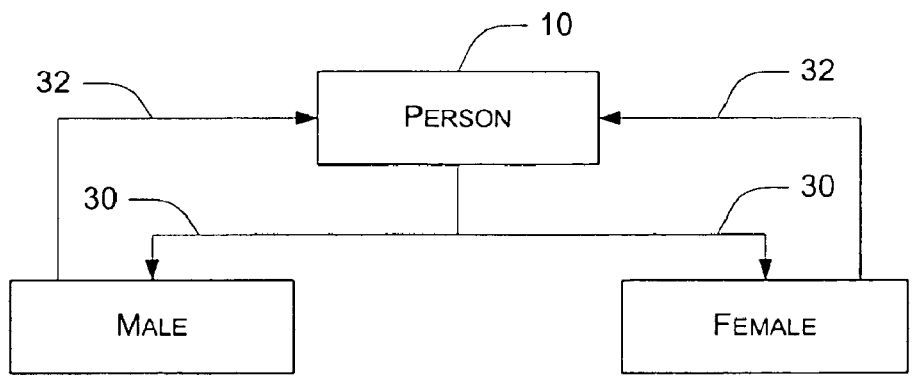
*Fig. 3*

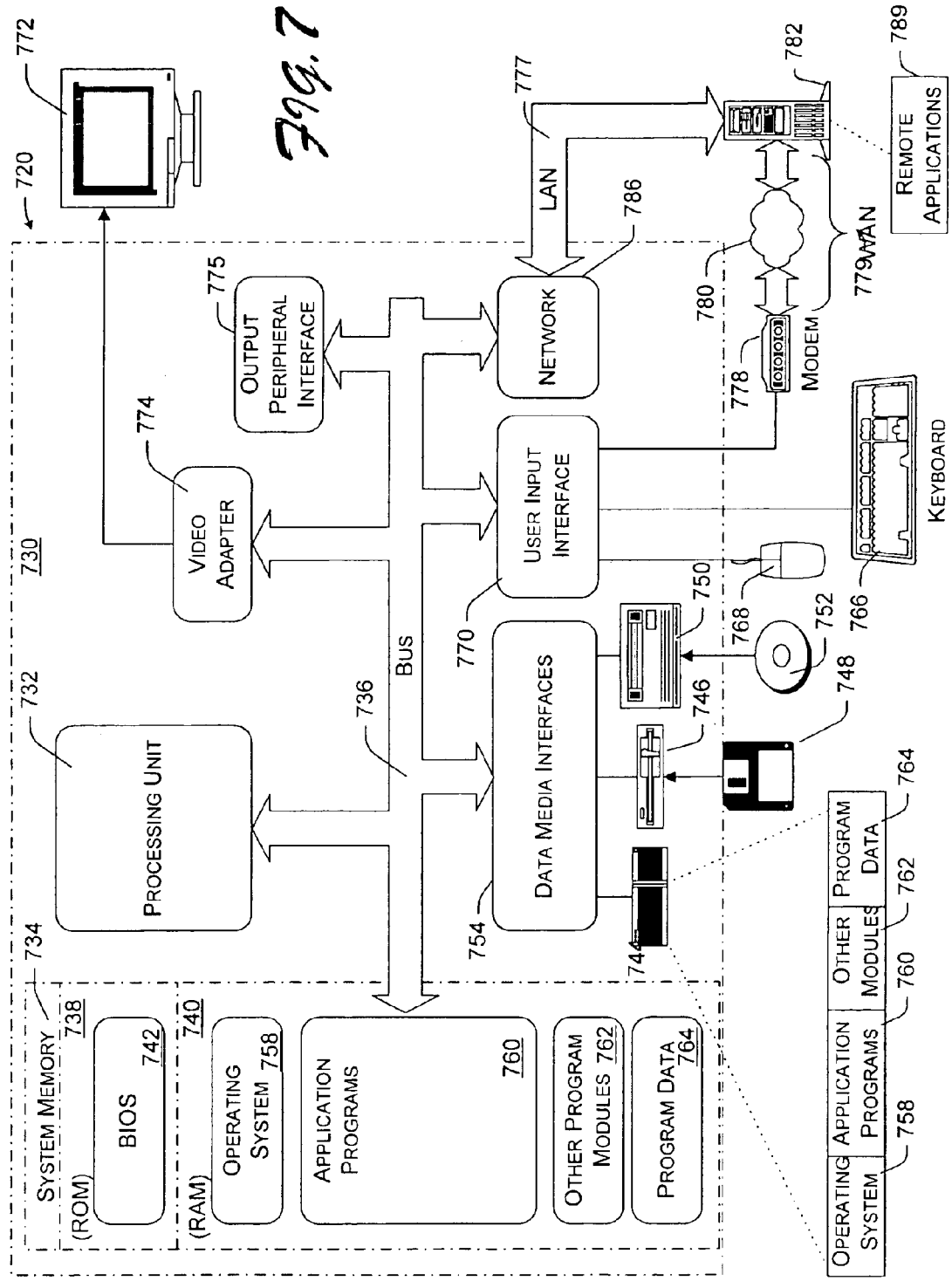

EXTENDING A DIRECTORY SCHEMA INDEPENDENT OF SCHEMA MODIFICATION

TECHNICAL FIELD

The following subject matter pertains to extending the operational and/or data providing nature of a content class defined in a directory schema independent of any modification to the directory schema.

BACKGROUND

A directory schema is a collection of base content classes and associations. These base content classes and associations abstract tangible and intangible items or "objects" that can be represented in a directory. For instance, a schema may include base content classes that represent computers, peripherals, network switches, operating systems, applications, network connections, people, and so on.

Directory schema are typically very carefully designed to provide content classes to meet present and future requirements of a directory. However, directory schema are often extended to meet needs of the directory that were not foreseeable at the time that the schema was designed. For instance, just because one version of a product works with the directory schema, does not mean that other or new product versions or different products will properly function with the schema. Specifically, any variation of the type information required by a product or product versions over time generally results in the need to extend the directory schema to specifically represent each piece of interesting information that a new product or a new version of the product requires to properly operate. Because of this, third parties typically extend directory schema to create new content classes and attributes.

Conventional practice, however, is to strictly control directory schema updates because modifying a directory schema requires specialized knowledge and can have complex, serious, and far-reaching consequences for customers. For example, extending directory schema to support specific products and product versions means that these different products and product versions will have mutually exclusive schema. Thus, a product that was usable with one schema may become unusable with a different schema.

For instance, suppose object X is an instance of class Y. Class Y has an attribute, Z. Therefore, because object X is an instance of class Y, object X can have this attribute defined on it. Assume that X does indeed have this attribute currently defined in it. Now a schema update is performed that modifies class Y by deactivating attribute Z. Note that this change makes the instance of object X invalid because X now has an attribute, Z, that it is not allowed to have according to the class definition of Y (of which object X is an instance).

Additionally, directory schema extensions or additions are not reversible and always add to the size of the schema. In other words, once a class or attribute has been added to the schema it cannot simply be removed from the schema once it is no longer required. Continuous schema growth due to schema extension results in a problem that is generally referred to as "schema bloat".

The size of a directory schema or schema bloat becomes relevant when considering that schema changes are global to a distributed computing environment. An extended schema needs to be globally replicated to every domain server on the network. I.e., a distributed directory shares a common directory schema for the entire forest of directory trees that are organized as peers and connected by two-way transitive trust relationships between the root domains of each tree; when the directory schema is extended, the forest is extended.

The collection of data that must be copied across multiple servers (i.e., the unit of replication) during schema replication is the domain. A single domain may contain a tremendous number or objects (e.g., millions of objects). Thus, schema extensions typically result in a substantial amount of replication traffic across the globe on multiple servers—and the larger the schema, the larger the amount of replication traffic.

Moreover, schema replication procedures may result in replication latencies across servers in the distributed environment, causing temporary inconsistencies between various server versions of the schema. For example, consider that a new class A is created at server X, and then an instance of this class is created at the same server X. However, when the changes are replicated to another server Y, the object B is replicated out before the object A. When the change arrives at server Y, the replication of B fails because server Y's copy of the schema still does not contain the object A. Hence, Y does not know about the existence of A.

In light of these considerations, it is apparent that schema extensions typically require a substantial amount of computing resources and data bandwidth as well as coordination between network administers to ensure that legacy applications in various domains properly operate with the updated schema. Accordingly, installing products on organizational networks that require directory schema changes can be risky, potentially politically difficult, and a time-consuming process.

The following subject matter addresses these and other problems that are associated with schema extensions.

SUMMARY

The described arrangements and procedures provide a directory schema with object classes that have flexible attributes. This means that attributes can be extended independent of modifications to the directory schema. Specifically, an object instance of a content class described in the directory schema is instantiated. The content class includes a flexible attribute having a data type. A property is assigned to the attribute. The property is any combination of an operational and data providing property. The property is independent of the attribute's data type. Thus, without modifying the directory schema, multiple instances of the same object class can have attributes that provide completely different data types and completely different data operations.

BRIEF DESCRIPTION OF THE DRAWINGS

FIG. 1 shows a conventional object-oriented object class representation.

FIG. 2 shows further aspects of conventional object-oriented object class representation. Specifically, FIG. 2 shows that a class with attributes is typically represented by a rectangle divided into two regions.

FIG. 3 shows that class inheritance, or a subclass/superclass relationship between classes is conventionally represented by a line drawn between the subclass and the superclass.

FIG. 7 illustrates an example of a suitable computing environment on which an exemplary directory schema with flexible attributes may be implemented.

DETAILED DESCRIPTION

Figure 4:
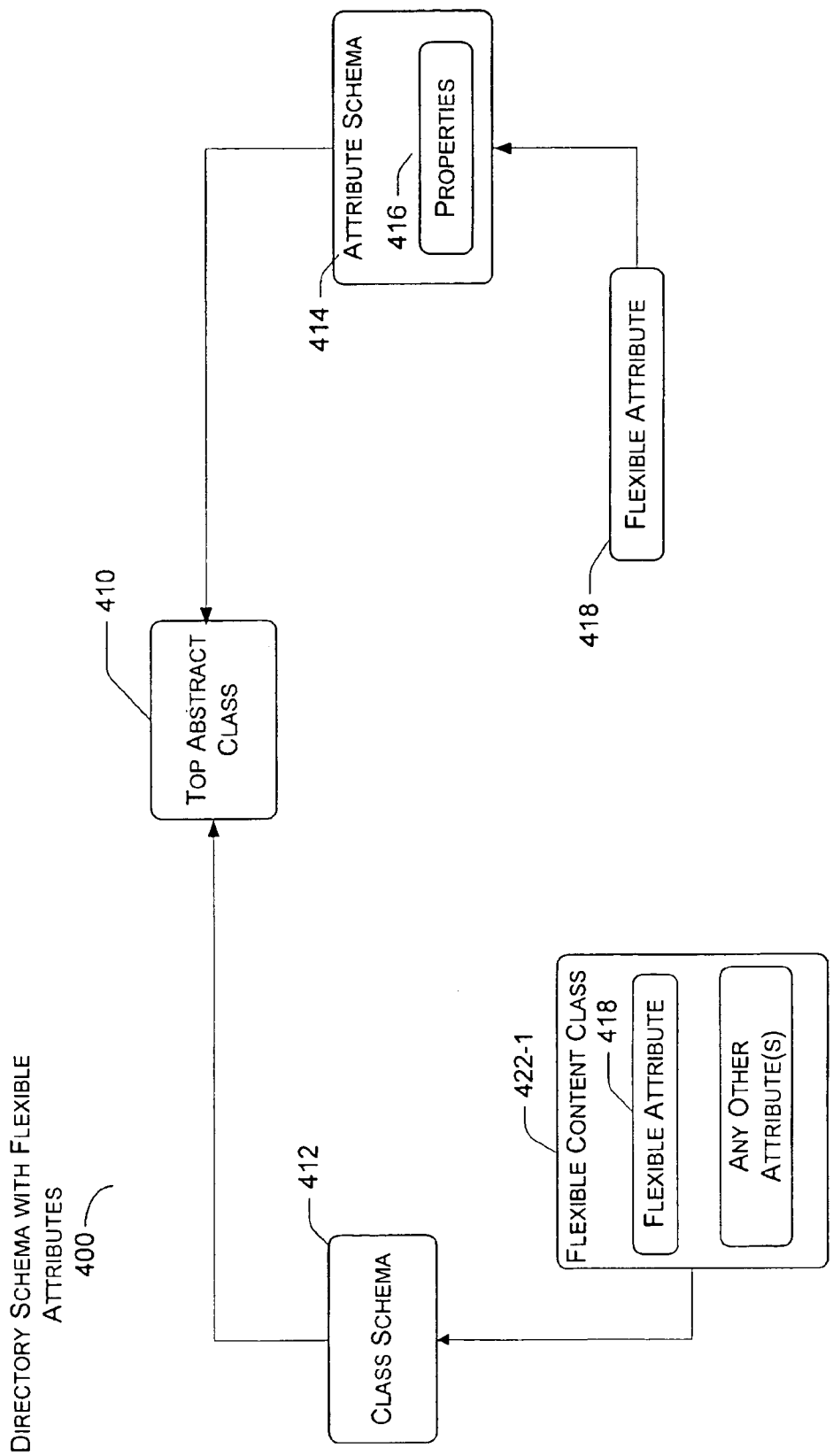
FIG. 4 shows a directory schema having a flexible attribute. A flexible attribute's operational and/or data providing nature can be changed in various object instances that include the attribute without requiring directory schema modifications.

The implementation incorporates elements recited in the appended claims. The implementation is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

A Schema

A schema is a collection of content classes and associations that abstract items, or "objects" that tangibly or intangibly exist in the real world. A content class models a set of items that have similar properties and fulfill similar purposes. A content class defines the purpose or content of an item by containing as its elements a list of properties appropriate for that purpose or content. Content classes imply a set of semantic requirements for the item. Content classes follow a hierarchical structure.

Classes can have subclasses, also referred to as specialization classes. The parent class of a subclass is referred to as a superclass or a generalization class. A class that does not have a superclass is referred to as a base class. A subclass inherits properties of its superclass. All properties and methods of a superclass apply to the subclass.

A class 10 is represented by a rectangle containing the name of the class. FIG. 1 shows an example. A class with attributes is represented by a rectangle divided into two regions as in FIG. 2, one region containing the name of the class 20 and the other region including a list of properties 22 such as what attributes are mandatory, what attributes are optional, and other properties such as what content class can be a parent of the current content class.

Class inheritance represents a subclass/superclass relationship between two or more classes. Most content classes will extend ("inherit") an existing content class. To extend a content class means that all of the properties on instances of the extended (derived) content class also exist on instances of the extending (base) content class. The act of creating an object of a particular class (or "data type") is called "instantiation" of the particular class, thereby creating an "object instance" of the class. An object instance is a collection of values, or attributes that conform to the type established by the class definition. Hereinafter, the term "object" may be used to refer to either an instance or a class.

Class inheritance can be within a namespace or across namespaces. A namespace is simply any bounded area in which standardized names can be used to symbolically represent some type of information (e.g., an object in a directory or an Internet Protocol [IP] address) that can be resolved to the object itself. Inheritance is typically represented by a line drawn between a subclass and a superclass, with an arrow adjacent to the superclass indicating the superclass. Lines representing inheritance from a base class are indicated by reference numeral 30. Associations are conventionally shown as a line between two classes, as indicated by reference number 32.

A Directory Schema with Flexible Objects and Attributes

FIG. 4 shows a directory schema 400 with attributes that can be extended independent of schema modifications. Specifically, the directory schema 400 includes a "top" or parent class 410. All other classes in the schema (e.g., the class schema class 412 and the attribute schema class 414) inherit from the top a abstract class. The top abstract class includes a number of attributes (not shown) such as an X500 access control list (X500 is a well known directory protocol), any directory schema extension specific information, and other information that can be used by a directory service to instantiate the directory schema 400.

In this example, all directory schema 400 structural objects (other than "top") inherit properties from the class schema class 412. Structural content classes (with the exception of the "top" content class) include only those attributes that are defined by the attribute schema class 414 or those attributes defined by content classes that have been derived from the attribute schema class 414. We now describe properties of the attribute schema content class.

The Attribute Schema Content Class

The attribute schema class 414 provides for a number of properties 416. Any attribute class 418 is derived from the attribute content class 414 will inherit these properties.

The properties 416 include, for example:

"cn", or common-name—every object in a directory has a naming attribute from which its relative distinguished name (RDN) is formed. The naming attribute for attribute schema objects is "cn", or common-name. The value assigned to "cn" is the value that the attribute schema object will have as its RDN.

lDAPDisplayName—the name used by Lightweight Directory Access Protocol (LDAP) clients, to read and write the attribute using the LDAP protocol. An attribute's lDAPDisplayName is unique in the schema 400 container, which means it must be unique across all class schema 412 and attribute schema 418 objects.

description—a text description of the attribute.

adminDisplayName—a display name of the attribute for use in administrative tools.

isSingleValued—a Boolean value that is TRUE if the attribute can have only one value or FALSE if the attribute can have multiple values. If this property is not set, the attribute has a single value.

searchFlags—an integer value whose least significant bits indicate whether the attribute is indexed. The bit flags in this value are: 1=index over attribute only; 2=index over container and attribute; 4=add this attribute to the ambiguous name resolution (ANR) set; 8=preserve this attribute in a tombstone object for deleted objects; 16=copy the attribute's value when a copy of the object is created.

isMemberOfPartialAttributeSet—a Boolean value that is TRUE if the attribute is replicated to the global catalog or FALSE if the attribute is not included in the global catalog.

systemFlags—an integer value that contains flags that define additional properties of the attribute such as whether the attribute is constructed or non-replicated.

systemOnly—a Boolean value that specifies whether only a directory service can modify the attribute.

objectClass—identifies the object class of which this object is an instance, which is the class schema 412 object class for all class definitions and the attribute schema 418 object class for all attribute definitions.

attributeSyntax—the object identifier of the syntax for this attribute. The combination of the attributeSyntax and oMSyntax properties determines the syntax of the attribute, that is, the type of data stored by instances of the attribute.

oMSyntax—an integer that is a directory service representation of the syntax.

oMObjectClass—an octet string that is specified for attributes of oMSyntax. For attributes with any other oMSyntax value, this property is not used. If no oMObjectClass is specified for an attribute with an oMSyntax, the default oMObjectClass is set. Usually, there is a one-to-one mapping between the attributeSyntax and the oMObject class.

attributeID—the object identifier (OID) of this attribute. This value is unique among the attributeIDs of all attribute schema 418 objects and governsIDs of all class schema 412 objects.

schemaIDGUID—a globally unique identifier (GUID) stored as an octet string. This GUID uniquely identifies the attribute. This GUID can be used in access control entries to control access to instances of this attribute.

attributeSecurityGUID—a GUID stored as an octet string. This is an optional GUID that identifies the attribute as a member of an attribute grouping (also called a property set). This GUID is used to control access to all attributes in the property set.

rangeLower and rangeUpper—a pair of integers that specify the lower and upper bounds of the range of values for this attribute. All values set for the attribute must be within or equal to the specified bounds. For attributes with numeric syntax the range specifies the minimum and maximum value. For attributes with string syntax the range specifies the minimum and maximum size, in characters. For attributes with binary syntax, the range specifies the number of bytes.

linked—an integer that indicates that the attribute is a linked attribute. An even integer is a forward link and an odd integer is a back link. These properties are only examples of attribute schema content class 414 properties. Various systems and directory implementations may define different properties other than properties 416.

Exemplary Flexible Attribute Content Class

A flexible attribute 418 class is derived from the attribute schema content class 414. Thus, an instantiated flexible attribute inherits the exemplary properties 416 of the attribute schema content class. Table 1 provides an example of the values of the flexible attribute 418 class.

TABLE 1

EXAMPLE OF FLEXIBLE ATTRIBUTE KEY PROPERTIES

| Properties 416 of Flexible Attribute 418 | Value |
|---|---|
| Cn | String |
| LDAPDisplayName | String |

TABLE 1-continued

EXAMPLE OF FLEXIBLE ATTRIBUTE KEY PROPERTIES

| Properties 416 of Flexible Attribute 418 | Value |
|---|---|
| Description | This attribute contains XML information used by a service |
| AdminDisplayName | String |
| adminDescription | Directory ServiceInternal Use Only |
| isSingleValued | TRUE |
| SearchFlags | 0x0 |
| isMemberOfPartialAttributeSet | FALSE |
| Systemflags | Not Replicated |
| SystemOnly | FALSE |
| ObjectClass | Attribute Schema 414 of FIG. 4 |
| attributeSyntax | String (e.g., XML) |
| OMSyntax | 64 |
| oMObjectClass | |

The data type (e.g., "attributeSyntax") of the flexible attribute is a text string data type. An application using an object instance that includes the flexible attribute can store, for example, an XML string on the flexible attribute property "attributeSyntax". XML strings can represent any type of information (e.g., complex data structures, declarative conditions, numbers, text, punctuation, sequences of operations, values, operational statuses, and so on) on the flexible attribute 418. In this manner, the flexible attribute content class 418 can be assigned any number of value(s) and meaning that is completely independent of the actual data type of attributeSyntax. Although this example describes the flexible attribute 418 with respect to the use of XML, other markup language data formats could be used rather than XML.

Conventional systems and techniques for directory schema definition require that objects conform to fixed data formats of classes defined in the directory schema. In other words, for example, if a class consists of ten (10) data elements, then any object that is based on that class will require the data storage to store those 10 data elements, regardless of whether each of the 10 elements even contain any data. Typically database input data is very sparse (the vast majority of possible cells, defined as combinations of dimension members, actually contain no data). Data sparsity caused by allocated object elements in a database that are unused may become problematic and contribute to wasted data storage space and in some cases, decreased database query response times.

For instance, thinly distributed input data values may each have any number (e.g., hundreds) of computed dependent cells (i.e., data relationships) in a database. If the data is sparse, then the computational space needed to calculate relationships between database elements is much denser than the actual input data. Thus, a database's data relationship calculations (i.e., pre-computed or on the fly) may require far more processing than otherwise expected (this is independent of the storage technology used).

In contrast to such conventional systems and techniques that require directory objects to conform to fixed predetermined directory schema data formats, a directory schema utilizing the flexible attribute content class 418 does not have this rigid requirement. Rather, an object based on the flexible attribute content class 418 need only represent that information that an application's particular implementation requires. This solves the problematic data sparsity problem associated with the described conventional systems and techniques.

Moreover, a directory schema designer that utilizes the flexible attribute content class 418 in the directory schema is not required to modify the directory schema to extend it. Rather, the program or application designer can create new structural object classes or attributes based on the flexible attribute 418 to support new application data requirements, versions, and so on—independent of directory schema modification and without contributing to data sparsity of the directory database.

An object class 422 that is designed to utilize the flexible attribute class 418 is now described.

An Exemplary Flexible Structural Content Class

The class schema content class 412 includes object class definitions for objects 422. There can be any number of content classes 422 that are derived from class schema 412. Flexible content class 422 is derived from class schema 412 and includes the flexible attribute 418. Any class that is derived from the extensible content class will inherit the flexible attribute.

An application using an object instance of a content class 422 can put, for example, an XML string on the flexible attribute 418. Thus, the application can assign any type of information such as data value, declarative conditions, operations, operational statuses, and/or the like, on the flexible attribute 418. This ability for an application to modify the operational and/or data providing nature of a directory object that includes the flexible attribute is accomplished without needing to modify the directory schema to create new structural object classes or attributes to include these various data and/or operational characteristics.

Moreover, this is accomplished without making the data and/or various operations stored on the flexible attribute 418 opaque to other applications. For instance, data stored on a flexible attribute 418 using a markup language (e.g., XML) can be parsed by an application without a-priori knowledge of what the data is or how the data is packed into the flexible attribute 418 (i.e., the data is not opaque).

In contrast, to the non-opaque characteristic of data stored on the flexible attribute 418, if data indications are encoded as a binary string of zero's (0) and ones (1) in some number of bytes in an attribute, an application would need to know not only how to unpack the bits of information in the attribute, but would also need to understand what each respective bit represented (i.e., a flag, an operation, a value, and so on). Thus, data packed as a binary string is opaque, meaning that an application will not know what the data represents or how to unpack the data unless the application is preconfigured to properly unpack and understand the contents of the binary string.

Accordingly, the described subject matter takes a new and more flexible approach to "extending" the capability of directory schema content classes. This is a substantial benefit over the opaque data characteristics of conventional data representation and the inflexible structural content classes and attributes of conventional directory schema.

An Exemplary System

Figure 5:
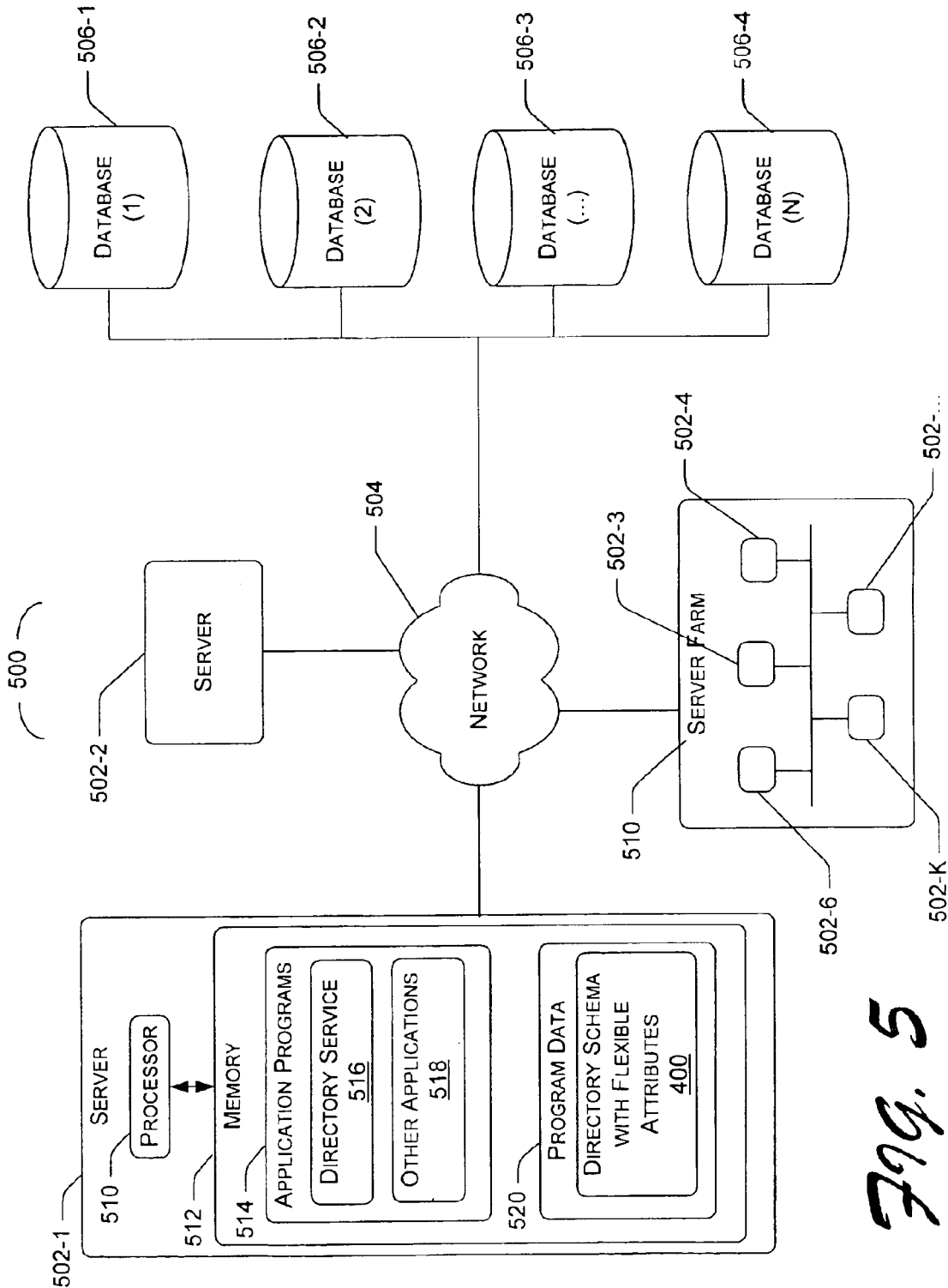
FIG. 5 shows an exemplary system to implement a directory schema with flexible attributes.

FIG. 5 shows an exemplary system 500 to implement a directory schema 400 of FIG. 4 with flexible structural content classes and attributes. The system provides a logically centralized, but physically distributed directory infrastructure of machines and resources. The system includes any number of servers 502 that are operatively coupled not only to one another over a network 504, but also operatively coupled to one or more databases 506 over the network.

The network can be any type of network such as the Intranet, an organizational intranet, a Local Area Network (LAN), and so on. For instance, a server 502 can be operatively coupled to the network through one or more server appliances (not shown) located on the extreme outside of a Web server farm 508, a corporate portal, etc.

Databases 506 include, for example, directories of enterprise users, resources, financial information, corporate e-mail systems, network operating systems, and the like. A database is an unstructured or structured data store such as object-oriented database such as an XML database, a Hypertext Markup Language (HTML) database, an SQL server database, and/or the like.

A server 502 includes a processor 510 coupled to a memory 512. The memory 512 includes computer readable media in the form of volatile memory, such as random access memory (RAM), and/or non-volatile memory, such as read only memory (ROM).

The processor is configured to fetch and execute computer-executable instructions from application programs 514 and configured to fetch data from program data 520. The application programs 514 include a directory service 516 and other applications 518 (e.g., an operating system, etc.).

The directory service 516 stores information about objects such as computers and resources on a network and makes this information available to users and network administrators in a directory that ties disparate databases 506, or "directories" of data together into a single, logical directory, or "metadirectory". Specifically, the directory service manages and maintains a distributed directory that is based on the directory schema 400 with flexible attributes.

An Exemplary Procedure to Extend a Schema Independent of Modification

Figure 6:
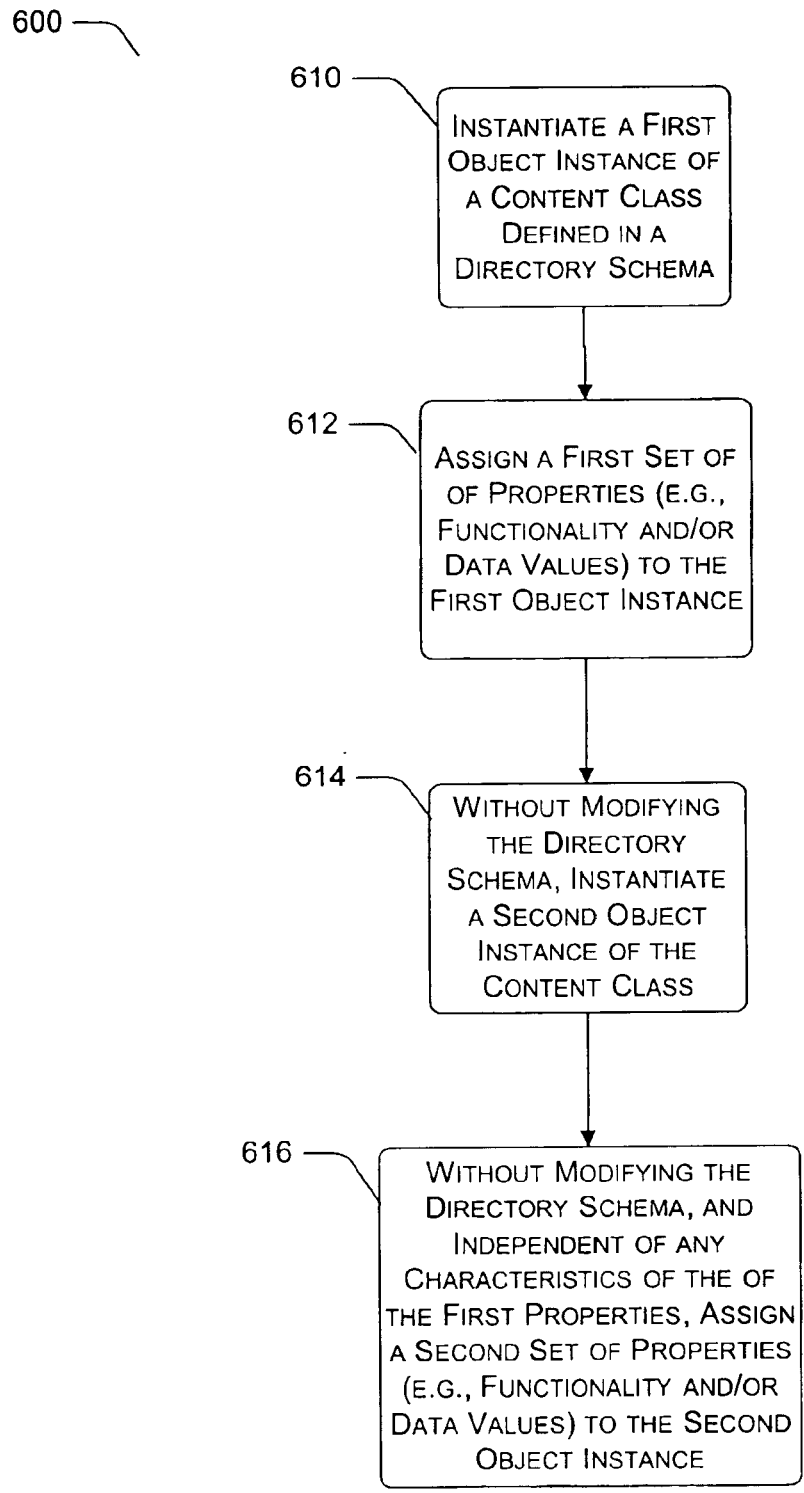
FIG. 6 shows an exemplary procedure to change the operational or data providing nature of multiple object instances of a base content class in a directory schema independent of modifying the directory schema.

FIG. 6 shows an exemplary procedure 600 to change the operational or data providing nature of multiple object instances of a base content class in a directory schema independent of modifying the directory schema. At block 610, the procedure instantiates a first object instance of a flexible content class 422.

At block 612, the procedure assigns a first data string (e.g., XML) to a flexible attribute 418 in the first flexible object instance (block 610), the first data string defines any combination of a first operational and a data providing nature of the first object instance. Specifically, an application that has instantiated or that is using the first object instance knows of the first object instance's interface and how to unpack and use the first data string.

At block 614, independent of any modification to the directory schema 400, the procedure generates a second object instance of the same content class 422 that was used to create the first object instance (block 610). At block 616, the procedure puts a second data string onto the second object instance. The second data string defines a second operational and/or data providing nature of the second object instance. The first and second operational and/or data providing natures do not need to be the same. Indeed, they can be completely different in all respects other than that they are represented in a text string. The application using the second object instance knows of the second object instance's interface and how to unpack and use the second data string.

For instance, consider that an application can assign the flexible attribute in the first instantiated object to have any combination of one or more data types (e.g., integer, real, string, floating, character, and so on), or operational properties (e.g., an operation can be defined to do just about anything imaginable such as to send an e-mail message, to report statistics, to manage a rocket launch, and so on). Whereas the flexible attribute in the second instance of the object can be assigned completely different properties that are independent of any characteristics of the data types or operations that correspond to the flexible attribute of the first instance of the object.

In yet another example, consider the following XML string shown in Table 1.

TABLE 1

EXAMPLE OF A FIRST STRING TO BE APPLIED TO A FIRST INSTANCE OF THE FLEXIBLE OBJECT

```
<data>
    <dataType>integer</dataType>
        <value>2</value>
        <name>integerValue</name>
    <DataType>Real</DataType>
        <value>512.6</value>
        <name>realValue</name>
    <dataType>integer</datatype>
        <name>result</name>
</data>
<operation>
    <integerVal + abs(realValue) = result>
</operation>
```

An application can assign the string of Table 1 to a flexible attribute 418 of type string in a first instance of a flexible object 422. In this case, the string of Table 1 provides both data and operational properties to the flexible attribute. Specifically: (a) an integer variable "integerValue" is defined with a value of two (2); (b) a real variable "realValue" is defined with a value of 512.6; and (c) an addition operation that adds integerValue to the absolute ("abs") value of realValue is defined. Thus, the XML string of Table 1 provides specific data and operations to the first instance of the object.

Now consider the following XML string of Table 2.

TABLE 2

EXAMPLE OF A SECOND STRING TO BE APPLIED TO A SECOND INSTANCE OF THE FLEXIBLE OBJECT

```
<application>www.somedestination.org/
applicationname.exe</application>
```

Independent of any modification to the directory schema, the application can assign the string of Table 2 to a flexible attribute 418 of type string in a second instance of a flexible object 422. In this case, the string of Table 1 provides both data. Specifically, the string identifies a Universal Resource Location (URL) of a computer program application.

In contrast to conventional schema (wherein once an attribute is assigned a particular data type, only data of that predetermined data type can be represented by that attribute), a flexible attribute 418 can take on multiple values (e.g., integers, real numbers, operations, and so on) independent of the attributes 418 actual data type. Specifically, as the previous examples show, the described arrangements and procedures accomplish this independent of modifications to the directory schema to create corresponding content classes.

This multi-valued aspect of a single attribute of multiple object instances of the same base content class in a directory schema, allows a directory schema to be "versioning aware". Specifically, this is because application providers can upgrade and provide new products that utilize flexible attributes 418 without extending the directory schema. This allows third parties to provide products and product upgrades without extending directory schema to take into consideration the specific needs of the products and product upgrades. Accordingly, a directory that is based on a directory schema 400 comprising object classes 422 with flexible attributes 418 is a "versioning aware" directory.

For example, consider the first XML string or document "<a> Data </a>". A first version of a product understands and extracts this first string. A third party or user can simply extend the first document to support additional product versions or a new product by appending new data to the original data. For example, the following information: "<b>Data2</b>" can be appended to the first document to obtain the following: "<a> Data </a><b>Data2</b>". In this case, the original data format of the first string is maintained and the first product versions (e.g., legacy applications) are able to continue operations using the original data format. New applications or product upgrades that are aware of new data (e.g., "<b>") can obtain the new data from the document.

Accordingly, while extending the data characteristics and/or operational functionalities of various object instances of a same directory schema base content class, the described arrangements and procedures completely avoid schema bloat as well as the complex and serious consequences of procedures to extend and replicate a directory schema because the directory schema is not modified.

An Exemplary Computing Environment

FIG. 7 illustrates an example of a suitable computing environment 720 on which a system to generate and manage objects based on an exemplary directory schema 400 with flexible attributes 418 may be implemented.

Exemplary computing environment 720 is only one example of a suitable computing environment and is not intended to suggest any limitation as to the scope of use or functionality of an exemplary directory schema with flexible attributes. For example, another exemplary environment is described above in reference to FIG. 5. Neither should the computing environment 720 be interpreted as having any dependency or requirement relating to any one or combination of components illustrated in the exemplary computing environment 720.

An exemplary system to generate and manage objects based on a directory schema with flexible attributes 400 is operational with numerous other general purpose or special purpose computing system environments or configurations. Examples of well known computing systems, environments, and/or configurations that may be suitable for use with an exemplary directory schema with flexible attributes include, but are not limited to, personal computers, server computers, thin clients, thick clients, hand-held or laptop devices, multiprocessor systems, microprocessor-based systems, mainframe computers, distributed computing environments such as server farms and corporate intranets, and the like, that include any of the above systems or devices.

An exemplary system to generate and manage objects based on a directory schema with flexible attributes 400 may be described in the general context of computer-executable instructions, such as program modules, being executed by a computer. Generally, program modules include routines, programs, objects, components, data structures, etc. that performs particular tasks or implement particular abstract data types. An exemplary directory schema with flexible attributes may also be practiced in distributed computing environments where tasks are performed by remote processing devices that are linked through a communications network. In a distributed computing environment, program modules may be located in both local and remote computer storage media including memory storage devices.

As shown in FIG. 7, the computing environment 720 includes a general-purpose computing device in the form of a computer 730. Computer 730 could serve as an exemplary implementation of the server 502 of FIG. 5. The components of computer 720 may include, by are not limited to, one or more processors or processing units 732, a system memory 734, and a bus 736 that couples various system components including the system memory 734 to the processor 732.

Bus 736 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 730 typically includes a variety of computer readable media. Such media may be any available media that is accessible by computer 730, and it includes both volatile and non-volatile media, removable and non-removable media.

In FIG. 7, the system memory includes computer readable media in the form of volatile memory, such as random access memory (RAM) 740, and/or non-volatile memory, such as read only memory (ROM) 738. A basic input/output system (BIOS) 742, containing the basic routines that help to transfer information between elements within computer 730, such as during start-up, is stored in ROM 738. RAM 740 typically contains data and/or program modules that are immediately accessible to and/or presently be operated on by processor 732.

Computer 730 may further include other removable/non-removable, volatile/non-volatile computer storage media. By way of example only, FIG. 7 illustrates a hard disk drive 744 for reading from and writing to a non-removable, non-volatile magnetic media (not shown and typically called a "hard drive"), a magnetic disk drive 746 for reading from and writing to a removable, non-volatile magnetic disk 748 (e.g., a "floppy disk"), and an optical disk drive 750 for reading from or writing to a removable, non-volatile optical disk 752 such as a CD-ROM, DVD-ROM or other optical media. The hard disk drive 744, magnetic disk drive 746, and optical disk drive 750 are each connected to bus 736 by one or more interfaces 754.

The drives and their associated computer-readable media provide nonvolatile storage of computer readable instructions, data structures, program modules, and other data for computer 730. Although the exemplary environment described herein employs a hard disk, a removable magnetic disk 748 and a removable optical disk 752, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules (e.g., application programs 514 of FIG. 5) may be stored on the hard disk, magnetic disk 748, optical disk 752, ROM 738, or RAM 740, including, by way of example, and not limitation, an operating system 758, one or more application programs 760, other program modules 762, and program data 764 (e.g., the program data 520 of FIG. 5).

Each of such operating system 758, one or more application programs 760, other program modules 762, and program data 764 (or some combination thereof) may include an embodiment of an exemplary directory schema with flexible attributes. A user may enter commands and information into computer 730 through input devices such as keyboard 766 and pointing device 768 (such as a "mouse"). Other input devices (not shown) may include a microphone, joystick, game pad, satellite dish, serial port, scanner, or the like. These and other input devices are connected to the processing unit 732 through a user input interface 770 that is coupled to bus 736, but may be connected by other interface and bus structures, such as a parallel port, game port, or a universal serial bus (USB).

A monitor 772 or other type of display device is also connected to bus 736 via an interface, such as a video adapter 774. In addition to the monitor, personal computers typically include other peripheral output devices (not shown), such as speakers and printers, which may be connected through output peripheral interface 775.

Computer 730 may operate in a networked environment using logical connections to one or more remote computers, such as a remote computer 782. Remote computer 782 may include many or all of the elements and features described herein relative to computer 730.

Logical connections shown in FIG. 7 are a local area network (LAN) 777 and a general wide area network (WAN) 779. Such networking environments are commonplace in offices, enterprise-wide computer networks, intranets, and the Internet.

When used in a LAN networking environment, the computer 730 is connected to LAN 777 via network interface or adapter 786. When used in a WAN networking environment, the computer typically includes a modem 778 or other means for establishing communications over the WAN 779. The modem 778, which may be internal or external, may be connected to the system bus 736 via the user input interface 770 or other appropriate mechanism.

Depicted in FIG. 7, is a specific implementation of a WAN via the Internet. Computer 730 typically includes a modem 778 or other means for establishing communications over the Internet 780. Modem 778, which may be internal or external, is connected to bus 736 via interface 770.

In a networked environment, program modules depicted relative to the personal computer 730, or portions thereof, may be stored in a remote memory storage device. By way of example, and not limitation, FIG. 7 illustrates remote application programs 789 as residing on a memory device of remote computer 782. It will be appreciated that the network connections shown and described are exemplary and other means of establishing a communications link between the computers may be used.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the arrangements and systems using a directory based on a directory schema with flexible attributes 400 has been described in language specific to structural features and/or methodological operations, it is to be understood that the arrangements and systems using the directory schema with flexible attributes defined in the appended claims is not necessarily limited to the specific features or operations described. Rather, the specific features and operations are disclosed as preferred forms of implementing the claimed subject matter.

What is claimed is:

1. A computer implemented method for extending a directory schema independent of schema modification, the method comprising:
   instantiating, by an application program, a first object instance of a content class comprising a flexible attribute that is based on a complex data type, the first object instance being created in a directory based on the directory schema, the content class and flexible attribute being defined in the directory schema;
   accessing, by the application program, a first property to the attribute, the first property being operational or data providing in nature, the property having a data type that is independent of the complex data type; and
   independent of directory schema modification:
   (a) instantiating a second object instance of the content class, the second object comprising a second flexible attribute that is base on the complex data type;
   (b) assigning a second property to the second flexible attribute, the second property having a different number of data elements than the first property; and
   (c) wherein each data element in the first and second properties comprising data such that neither the first or second properties contribute to data sparsity of a directory based on the directory schema.

2. A method as recited in claim 1, wherein the directory schema is independent from any values that the object instance may store.

3. A method as recited in claim 1, wherein the complex data type is an XML data type.

4. A method as recited in claim 1, wherein the first property is described by an XML string, the XML string being compatible with the complex data type.

5. A method as recited in claim 1, wherein the directory schema defines a plurality of object classes for a versioning aware directory.

6. A computer implemented method for extending a directory schema independent of schema modification, the method comprising:
   instantiating, by an application program, a first object instance of a content class comprising a flexible attribute that is based on a complex data type, the first object instance being created in a directory based on the directory schema, the content class and flexible attribute being defined in the directory schema;
   accessing, by the application program, a first property to the attribute, the first property being operational or data providing in nature, the property having a data type that is independent of the complex data type; and
   independent of directory schema modification:
   without modifying the directory schema, instantiating a second object instance of the content class, the second object comprising a second flexible attribute that is base on the complex data type; and
   assigning a second property to the second flexible attribute, the second property being completely independent of any operational or data characteristics of the first property.

7. A method as recited in claim 6, wherein the first and second properties are described by respective XML strings that are compatible with the complex data type.

8. A server comprising:
   a processor coupled to a memory, the memory comprising computer executable instructions, the processor being configured to fetch and execute the computer-executable instructions for;
   instantiating a first object instance of a content class comprising a flexible attribute that is based on a complex data type, the first object instance being created in a directory based on the directory schema, the content class and flexible attribute being defined in the directory schema;
   accessing a first property to the attribute, the first property being operational or data providing in nature, the property having a data type that is independent of the complex data type; and
   independent of directory schema modification:
   (a) instantiating a second object instance of the content class, the second object comprising a second flexible attribute that is base on the complex data type;
   (b) assigning a second property to the second flexible attribute, the second property having a different number of data elements than the first property; and
   (c) wherein each data element in the first and second properties comprising data such that neither the first or second properties contribute to data sparsity of a directory based on the directory schema.

9. A server as recited in claim 8, wherein the directory schema is independent from any values that the object instance may store.

10. A server as recited in claim 8, wherein the complex data type is an XML data type.

11. A server as recited in claim 8, wherein the first property is described by an XML string, the XML string being compatible with the data type.

12. A server as recited in claim 8, wherein the directory schema defines a plurality of object classes for a versioning aware directory.

13. A server comprising:
   a processor coupled to a memory, the memory comprising computer executable istructions, the processor being configured to fetch and execute the computer-executable instructions for:
   instantiating a first object instance of a content class comprisings a flexible attribute that is based on a complex data type, the content class and flexible attribute being defined in a directory schema; and
   assigning a first property to the attribute, the first comprising a particular number of data elements, the first property being operational or data providing in nature, the property having a data type that is independent of the attribute's data type;
   without modifying the directory schema, instantiating a second object instance of the content class, the second object comprising a second flexible attribute that is based on the complex data type; and
   assigning a second property to the second flexible attribute, the second property being completely independent of any operational or data characteristics of the first property.

14. A sever as recited in claim 13, wherein the first and second properties are described by respective XML strings that are compatible with the complex data type.

15. A server for extending a directory schema independent of schema modification, the server comprising:

Processing means for:

instantiating a first object instance of a content class comprising a flexible attribute that is based on a complex data type, the first object instance being created in a directory based on the directory schema, the content class and flexible attribute being defined in the directory schema;

accessing a first property to the attribute, the first property being operational or data providing in nature, the property having a data type that is independent of the complex data type; and independent of directory schema modification:
(a) instantiating a second object instance of the content class, the second object comprising a second flexible attribute that is base on the complex data type;
(b) assigning a second property to the second flexible attribute, the second property having a different number of data elements than the first property; and
(c) wherein each data element in the first and second properties comprising data such that neither the first or second properties contribute to data sparsity of a directory based on the directory schema.

16. A server as recited in claim 15, wherein the directory schema is independent from any values that the object instance may store.

17. A server as recited in claim 15, wherein the complex data type is an XML data type.

18. A server as recited in claim 15, wherein the first property is described by an XML string, the XML string being compatible with the complex data type.

19. A server as recited in claim 15, wherein the directory schema defines a plurality of object classes for a versioning aware directory.

20. A server for extending a directory schema independent of schema modification, the server comprising:

processing means for:

instantiating a first object instance of a content class comprising a flexible attribute that is base on a complex data type, the content class and flexible attribute being defined in a directory schema; and assigning a first property to the attribute, the first property being operational or data providing in nature, the first property having a data type that is independent of the complex data type, the first property comprising a particular number of data elements;

independent of modification to the directory schema, instantiating a second object instance of the content class, the second object comprising a second flexible attribute that is based on the complex data type; and assigning a second property to the second flexible attribute, the second property being completely independent of any operational or data characteristics of the first property.

21. A server as recited in claim 20, wherein the first and second properties are described by respective XML strings that are compatible with the complex data type.

* * * * *